United States Patent
Yuhara et al.

(10) Patent No.: US 6,658,137 B1
(45) Date of Patent: Dec. 2, 2003

(54) ROAD SENSOR SYSTEM

(75) Inventors: Horimitsu Yuhara, Wako (JP); Tomoyoshi Aoki, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/534,349

(22) Filed: Mar. 24, 2000

(30) Foreign Application Priority Data

Apr. 19, 1999 (JP) .......................................... 11-110964

(51) Int. Cl.$^7$ ................................................ G06K 9/00
(52) U.S. Cl. ..................................................... 382/104
(58) Field of Search ................................ 382/104, 163, 382/193, 194, 225, 278; 340/903, 932, 937, 938, 942, 435, 436, 437, 146.2, 5.1; 701/28, 65, 116, 117, 300, 301, 302; 348/148, 149

(56) References Cited

U.S. PATENT DOCUMENTS

| | | | |
|---|---|---|---|
| 5,243,663 A | * 9/1993 | Kudoh | 382/104 |
| 5,530,420 A | * 6/1996 | Tsuchiya et al. | 340/435 |
| 5,675,489 A | * 10/1997 | Pomerleau | 701/28 |
| 5,874,904 A | * 2/1999 | Hirabayashi et al. | 340/903 |
| 6,285,778 B1 | * 9/2001 | Nakajima et al. | 382/104 |
| 6,493,458 B2 | * 12/2002 | Yasui et al. | 382/104 |

FOREIGN PATENT DOCUMENTS

JP 7-225126 8/1995 ............ G01C/3/06

* cited by examiner

*Primary Examiner*—Andrew W. Johns
*Assistant Examiner*—Shervin Nakhjavan
(74) *Attorney, Agent, or Firm*—Arent Fox Kintner Plotkin & Kahn

(57) ABSTRACT

A road sensor system is provided which comprises at least one imaging sensor, an extraction means that captures brightness values for a plurality of windows corresponding to the area immediately in front of the vehicle from an image that is captured from the imaging sensor and is divided into a plurality of windows. It extracts a reference brightness value on the basis of the plurality of brightness values. The system includes a judgment means that compares the brightness value of at least one other window with the reference brightness value and judges that the window belongs to the road area if the difference is smaller than a predetermined value. The road area is determined by detecting the road surface based on brightness rather than the distance to the road surface.

14 Claims, 4 Drawing Sheets

(a)

(b)

(c)

Road Area

ROAD SENSOR SYSTEM

TECHNICAL FIELD OF THE INVENTION

The present invention concerns a device, which detects road areas using an imaging means that employs a camera mounted on a vehicle such as an automobile, etc.

BACKGROUND OF THE INVENTION

In recent years, devices which judge the distance and size of objects in front of the vehicle and appropriately control the vehicle in accordance with this judgment have been proposed for the purpose of improving safety of driving vehicles.

An on-road object recognition apparatus which correctly recognizes objects in front of a vehicle is described in Japanese Patent Application Kokai No. Hei 7-225126 as a device associated with a method which uses an optical distance measuring device consisting of two light-receiving elements and judges whether imaged entities whose distances are detected are physical objects or road areas (including characters or white lines drawn on the road surface). This device is equipped with a stereo camera that images the road surface on which the vehicle is operating. The image obtained by this camera is divided into a plurality of windows, and the distance to the entity that is imaged is calculated for each window. Objects in front of the vehicle are recognized by comparing the distance to this entity that is imaged and a reference distance determined for each row range of the window.

In the device described in Japanese Patent Application Kokai No. Hei 7-225126, entities imaged by the camera are judged to be physical objects or road areas with an assumption that the road surface extends horizontally in front of the vehicle. Accordingly, in case the vehicle is inclined due to pitching or rolling, or in case the area in front of the vehicle is a slope or a bank, physical objects on the road surface may be erroneously judged and identified as road areas. Likewise road areas may be erroneously judged and identified as physical objects.

Accordingly, one object of the present invention is to provide a device which can detect road areas without confusing physical objects and road areas even in case the vehicle is inclined due to pitching or rolling, or in case the road surface on which the vehicle is running is a hill or a bank. Furthermore, another object of the present invention is to provide a device that can detect physical objects on the road surface (including other vehicles and obstructions) on the basis of the road areas that are detected.

SUMMARY OF THE INVENTION

A road area judgment system is provided which includes at least one imaging device or an image sensor, and an extraction device that acquires brightness values for a plurality of windows including image areas immediately in front of the vehicle from an image that is captured from the imaging sensor. The image is divided into a plurality of windows. The extraction means extracts a reference brightness value on the basis of the plurality of brightness values. The judgment system includes a judgment device that compares the brightness value of at least one other window with the reference brightness value and judges the other window to belong to a road area if the different is within a predetermined range.

According to the invention, the road surface itself is detected based on brightness rather than the distance to the road surface. Road areas can be determined without confusing physical objects and road areas even in case the vehicle is inclined due to pitching or rolling, or in case the area in front of the vehicle is a slope or a bank because determination does not depend on the distance.

According to another aspect of the invention, the system sets the brightness value of the other window that has newly been determined to be a road area by the judgment device as a new reference brightness value. The new reference brightness value is used for determining the next window. Thus, the reference value is progressively changed to reflect the variation of the brightness of the road according to locations in the whole image. This way, road areas can be determined with greater precision.

According to another aspect of the invention, the road area judgment system has at least two imaging sensors and equipped with measuring device that is installed at a predetermined spacing. The system measures the distance to an object on the basis of two or more images obtained by the two or more imaging sensors. The images areas that have brightness values significantly different from the road areas are judged to belong to a physical object other than the road, such as a car or to belong to a marking provided on the road. The measuring device measures the distance to such an object or to a marking.

According to another aspect of the invention, when a judgment is made that windows belong to a physical object or to a marked area on the road, further analysis is carried out based on the measured distance of such windows and the measured distance of other windows that have been determined to belong to a road area. If the distances match, the windows being studied are judged to belong to a marking on the road. Thus, markings on the road are distinguished from other physical objects such as cars.

DETAILED DESCRIPTION OF THE PREFERRED EMBODIMENT

Figure 1:
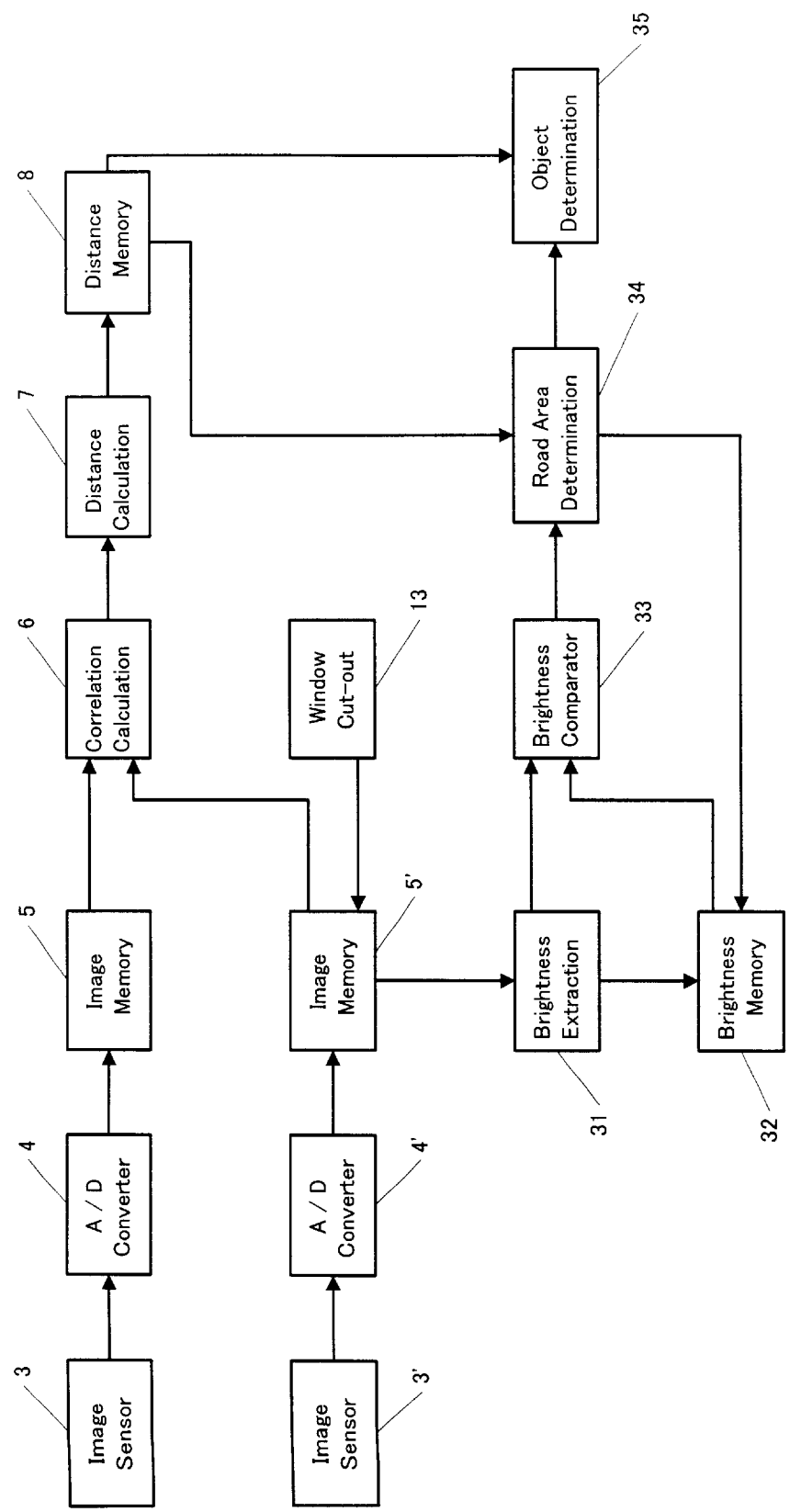
FIG. 1 is a block diagram illustrating the overall construction of one embodiment of the present invention.

A preferred embodiment of the present invention will be described with reference to the attached figures. FIG. 1 is an overall block diagram of the road area judgment system of one embodiment of the present invention. The system comprises a pair of image sensors 3 and 3', a pair of analog to digital converters 4 and 4', and a pair of image memories 5 and 5'. It also comprises a processor (CPU), RAM (random access memory) and ROM (read only memory) which jointly provides the functions of brightness extract part 31, brightness memory 32, brightness comparator 33, road area judging part 34, object detector 35, correlation calculator 6, distance calculator 7, distance memory 8, and window cut-out part 13.

More specifically, the ROM that is not shown in the drawings includes computer programs for performing the above identified functions. The CPU reads out the programs and executes them utilizing the RAM as a working space. The image memories 5, 5', brightness memory 32, and distance memory 8 may be respective areas of the RAM.

Figure 2:
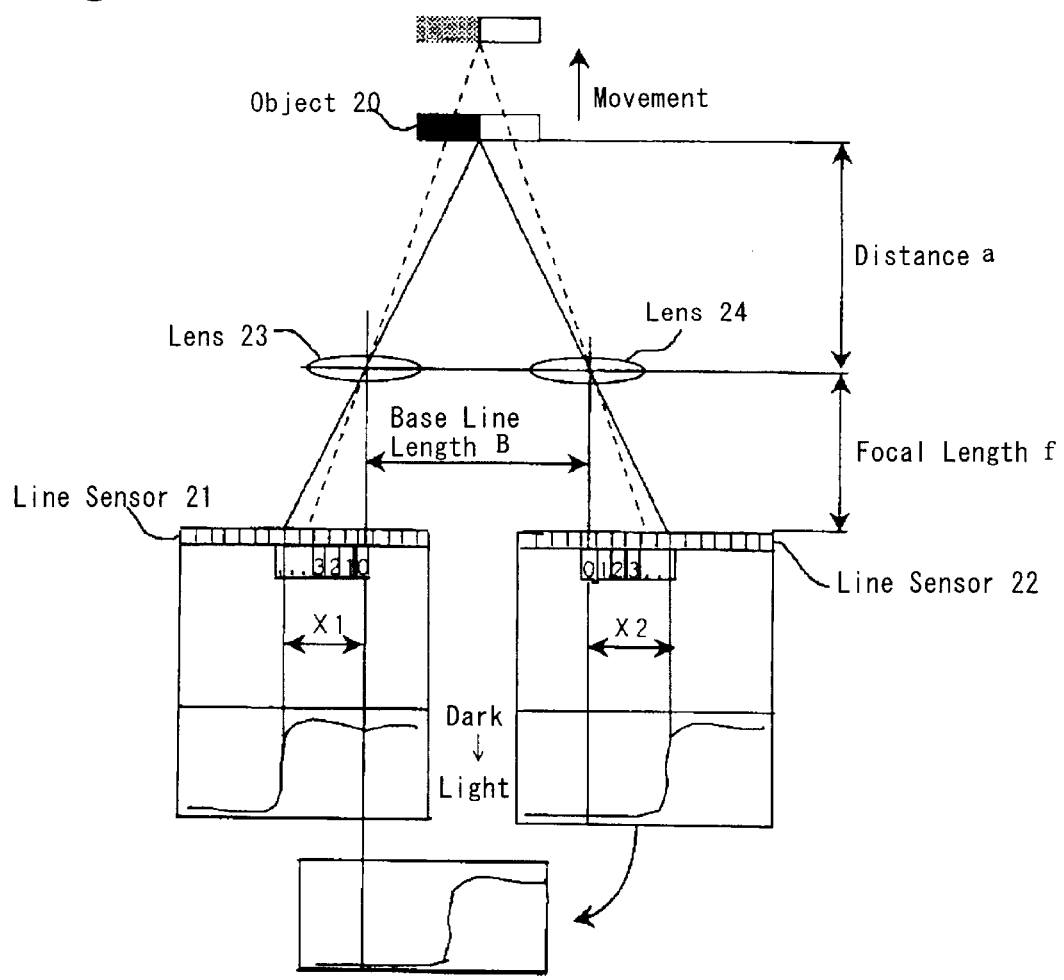
FIG. 2 is a diagram illustrating the principle of distance measurement by triangulation.

FIG. 2 is a diagram showing a distance measurement principle based on a triangulation method used in the present embodiment. First, a distance measurement method using a pair of imaging devices will be described with reference to FIG. 2.

A line sensor 21 and lens 23 constituting one of a pair of imaging devices are installed at a predetermined distance, i.e., at a distance equal to the base line length B in the left-right direction or vertical direction, as shown in FIG. 2 from the line sensor 22 and lens 24 constituting the other imaging device. The line sensors 21 and 22 are typically one-dimensional CCDs, but may also be linearly arranged photo-sensor arrays. When usage in the night is considered, imaging devices using infrared light are advisable. In this case, it is advisable to install infrared-transparent filters in front of the lenses 23 and 24, and to design the system such that the object 20 is illuminated at a predetermined period from an infrared light source. The line sensors 21 and 22 sense infrared light reflected from the object 20.

The line sensors 21 and 22 are respectively positioned at the focal lengths f of the lenses 23 and 24. Assume that an image of an object located at distance "a" from the plane of the lenses 23 and 24 is formed at a position shifted by a distance X1 from the optical axis of the lens 23 in the case of the line sensor 21, and is formed at a position shifted by a distance X2 from the optical axis of the lens 24 in the case of the line sensor 22. Then, according to the principle of triangulation, the distance "a" to the object 20 from the plane of the lenses 23 and 24 is determined by the equation, $a = B \cdot f/(X1+X2)$.

In the present embodiment, the images are digitized. Accordingly, the distance (X1+X2) is digitally calculated. The images obtained from the line sensors 21 and 22 are shifted relative to each other by a predetermined increment value such as one pixel at a time, and the difference between the digital brightness values of each of corresponding pixels of the two images is determined every time the images are relatively shifted. The sum of the absolute values of such differences is used as a correlation value for each shift. The correlation values are compared to each other to identify the smallest correlation. The amount of relative shift of the images that resulted in the smallest correlation indicates the positional deviation between the two images, that is, (X1+X2). In ideal terms, the distance by which the two images must be moved in order to cause said images to overlap (that is, zero correlation value) as shown in FIG. 2 is (X1+X2).

For the sake of simplicity, the imaging devices were described as one-dimensional line sensors 21 and 22. However, in one embodiment of the present invention, as will be described below, two-dimensional CCDs or two-dimensional photo-sensor arrays are used as imaging devices. In this case, the same correlation calculations as those described above are performed by relatively shifting the two-dimensional images obtained from the two imaging devices, and when the amount of shift at the point where the correlation value reaches a minimum is determined, this amount of shift corresponds to (X1+X2).

The imaging device 3 shown in FIG. 1 corresponds to one of the imaging sensor in FIG. 2, consisting of the lens 23 and line sensor 21, and the imaging device 3' corresponds to the other imaging sensor in FIG. 2, consisting of the lens 24 and line sensor 22. In the embodiment, as shown in FIG. 3(b), the imaged area is divided into a plurality of windows (small areas) $W_{11}$, $W_{12}$, ..., and the distance is measured for each window. Accordingly, a two-dimensional image of the overall object is required. Thus, the imaging devices 3 and 3' are constructed from a two-dimensional CCD array or a two-dimensional photo-sensor array.

FIG. 3(a) shows an example of the image captured by the imaging sensors 3 or 3' of a vehicle traveling in front of the system of the present invention. FIG. 3(b) shows the image of FIG. 3(a) schematically divided into a plurality of windows. FIG. 3(b) has rows in the vertical direction and columns in the horizontal direction. For the sake of simplicity, an arrangement in which the image is divided into 10 rows×15 columns of windows is shown. Numbers are assigned to the respective windows. For example, $W_{12}$ indicates the window in row 1, column 2.

With reference to FIG. 1, the system according to an embodiment of the invention includes a pair of image sensors 3 and 3', a pair of analog to digital converters 4 and 4', and a pair of image memory portions 5 and 5'. The images each captured by the imaging sensors 3 and 3' are converted into digital data by analog-digital converters (A/D converters) 4 and 4' and stored in image memories 5 and 5'.

A window cut-out controller 13 fetches digital data in the memories 5 and 5' on the basis of windows. For example, a window $W_{11}$ is cut out from the image memories 5 and sent to a correlation calculation part 6. Likewise, a corresponding portion to the window $W_{11}$ is cut-out from the image memory 5' and sent to the correlation calculation part 6, which in turn shifts the two cut-out images by a predetermined unit at a time and performs the correlation calculation that was discussed heretofore. Comparison of the correlation values is made to determine the minimum correlation value. As discussed above, the shift has generated the minimum correlation value gives (X1+X2). The correlation calculation part 6 sends the value of (X1+X2) thus determined to a distance calculation part 7.

The distance calculation part 7 determines the distance all to the object image in the window $W_{11}$ using the formula, $a = B \cdot f/(X1+X2)$. The distance $a_{11}$ thus determined is stored in a distance memory part 8. A similar calculation process is successively performed for the respective windows, and the resulting distances $a_{11}$, $a_{12}$, ... are stored in the distance memory part 8.

The distance calculation may also be performed only for the windows required for the use of the road area judgment part 34 and physical object detection part 35 described below. The distance to the object calculated for a certain window will be referred to as the measured distance of the window.

In the image data used in the correlation calculation, the resolution is determined by the pitch of the elements in the imaging element array. Accordingly, in case light-receiving elements that have a relatively large pitch, such as a photo-sensor array, are used, it is desirable that the density of the image data be increased by inter-pitch interpolation. The correlation calculation may be performed for image data whose density has thus been increased. Conversely, when a high density image sensor such as CCD is used, a predetermined number of pixels may be grouped into a cluster and the average brightness value of the predetermined number of pixels may be used as the brightness value of the cluster.

Furthermore, in order to correct for variations in the characteristics of the imaging element array according to temperature, a temperature sensor is installed in the vicinity of the imaging element array, and the distance calculations are corrected on the basis of temperature information obtained from this temperature sensor.

Figure 3:
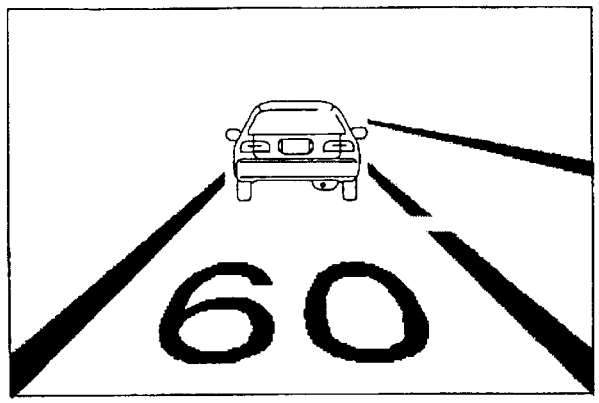
FIG. 3 shows (a) the acquired image, (b) the image divided into small areas (windows) used for distance and road area judgment, and (c) the output image, in the present invention.
Figure 3:
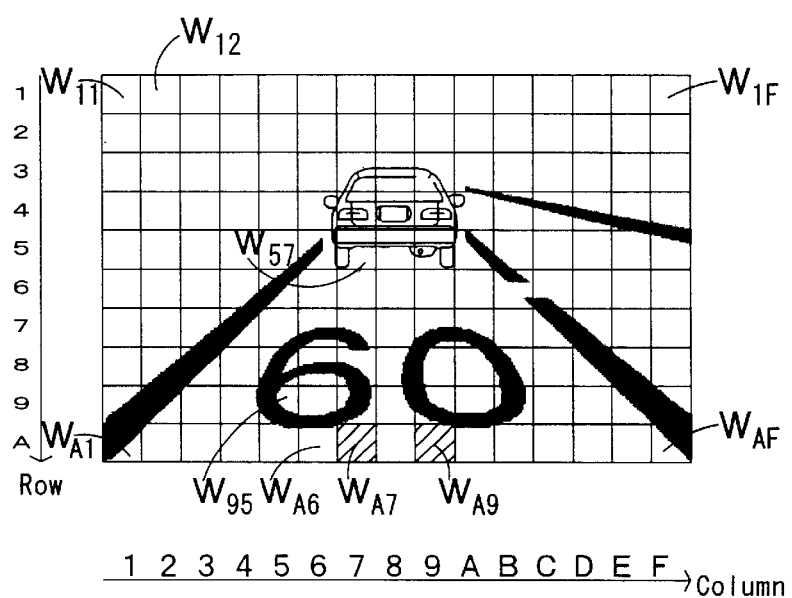
Figure 3:
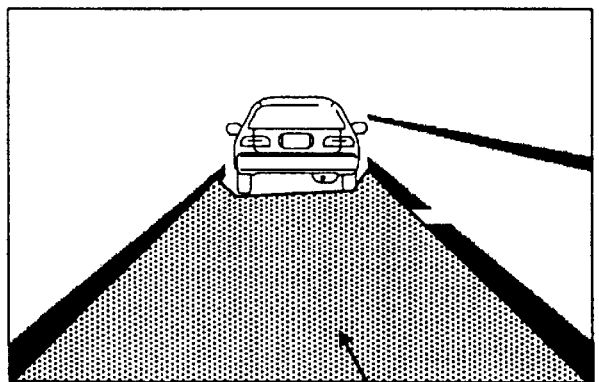

Next, determination of the road area in the images will be described with reference to FIGS. 1 and 3. In FIG. 3(b), as described above, a division into 10 rows×15 columns of windows is shown. In actuality, however, the image area can be very finely divided. Each of the windows may comprises a single pixel, but preferably comprises a plurality of pixels or one or more clusters. The respective windows may have the same size as the windows used to measure distance as described above, or may have a different size.

When the image obtained from the imaging sensor 3' is converted into digital data and stored in the image memory 5', the window cut-out part 13 in FIG. 1 cuts out a plurality of windows corresponding to the area immediately in front of the vehicle, which are transferred to a brightness extraction part 31. The part 31 extracts brightness values of the pixels or clusters in the cut-out windows. Brightness of a window is determined by averaging the brightness values of the pixels or clusters therein. Thus, brightness value of a window is an average brightness value of the pixels or clusters belonging to the window.

Brightness values of the windows corresponding to the area immediately in front of the vehicle are first used because it is highly likely that the area directly in front of the vehicle belongs to the surface of the road. Selection of the plurality of windows corresponding to the area immediately in front of the vehicle may be carried out in accordance with a predetermined scheme that takes into consideration the size of the vehicle carrying the system of the invention and the position of the image sensors in the vehicle as well as other factors.

In order to extract the intrinsic brightness value of the road, the windows corresponding to markings on the road surface need to be excluded. For example, in case the lowermost row includes several windows containing markings on the road surface, a fluctuation exists in the brightness values of the windows in this row because brightness of markings on the road surface is substantially different from the brightness of the road itself. To eliminate undesirable windows, the brightness values of the windows in this row are averaged and the windows having brightness values that are significantly different from the mean value are excluded.

Alternatively, since markings on the road surface are mainly colored white or yellow and are substantially different in color from the road itself, it is possible to exclude the brightness values in the color range of white and yellow. Furthermore, whether or not a brightness value extracted from a currently input image is the intrinsic brightness value of the road can be decided on the basis of a reference brightness value extracted from previously input images.

After the brightness values of windows corresponding to markings on the road surface have been excluded, the brightness extraction part 31 determines a reference brightness value by averaging the other brightness values of the windows in the lowermost row and stores the reference brightness value in a brightness memory 32. A plurality of brightness values may be determined each for a specific portion of the row. For example, the row may be divided into four parts and the reference brightness value may be determined for each part. These brightness values are expressed digitally with 256 gradations (ranging from pure black "0" to pure white "255").

Next, the window cut-out part 13 cuts out the windows in the second row from the image memory 5' and them to the brightness extraction part 31 one window at a time. The part 31 extracts the brightness value of the window and pass it to the brightness comparison part 33, which compares the extracted brightness value with the reference brightness value stored in the brightness memory 32.

The road area judgment part 34 judges road areas based on the comparison results passed from the brightness comparison part 33. If the difference of brightness values is within a predetermined range, the window in question is judged to be a road area. If the difference of brightness values is larger than a predetermined value, the window in question is determined to belong to a different physical object or to a marking on the road. The brightness values of windows judged to be road areas are stored in the brightness memory part 32 as a new reference value.

Initial reference values are determined by sampling one or more windows in the lowermost row. Referring to FIG. 3(b), windows $W_{A7}$ and $W_{A9}$ (windows indicated by diagonal shading) corresponding to the area immediately in front of the vehicle are cut out by the window cut-out part 13. The brightness extraction part 31 extracts the brightness values L1 and L2 of the respective windows and stores these values as reference brightness values in the brightness memory part 32. Next, the window $W_{A6}$ next to the window $W_{A7}$ is cut out and the brightness extraction part 31 extracts the brightness value of this window $W_{A6}$. The brightness comparison part 33 compares the extracted brightness value with the reference brightness value L1. If the difference is within a predetermined range (for example, a range of ±3), the road area judgment part 34 judges the window $W_{A6}$ to belong to the road area and stores the brightness value of the window $W_{A6}$ in the brightness memory part 32 as a new reference brightness value L3.

Next, the window $W_{A5}$ next to the window $W_{A6}$ is cut out and the brightness value of the window $W_{A5}$ is extracted by the brightness extraction part 31. The brightness comparison part 33 compares the extracted brightness value with the reference brightness value L3. If the difference is within the predetermined range, the road area judgment part 34 judges the window $W_{A5}$ to belong to the road area and stores the brightness value of the window $W_{A5}$ in the brightness memory part 32 as a new reference brightness value L4. This process is repeated with respect to the other windows in the same row and with respect to the windows in the successive rows to cover the entire image area. Thus, reference values are progressively generated.

The window cut-out part 13 cuts out windows in the vicinity of windows having the reference brightness value. If the window $W_{A6}$ has the reference value, it is desirable to cut out and process a window belonging to the same row or a window in the next row. This is because remote windows may have substantially different brightness values. By progressively generating reference values as discussed above, road areas can be accurately determined even when the brightness of the road varies according to the distance from the vehicle.

In accordance with another embodiment of the invention, a road area is determined by using the brightness values initially extracted from windows corresponding to the area immediately in front of the vehicle (L1 and L2 in the abovementioned example) as fixed reference brightness values. The brightness values of the respective windows are compared with these reference values.

In the embodiment discussed above, brightness values are extracted on the basis of a single image obtained from one imaging sensor 3'. In accordance with further another embodiment, brightness values are extracted using two or more images obtained from the two or more imaging sensors that are required for the distance measurements. For example, the reference brightness value L2 may be determined from the image obtained by the imaging sensor 3 and the reference brightness value L1 may be determined from the image obtained by the imaging sensor 3'.

It is preferable that the process for judging road areas by comparing brightness values be carried out by some form of parallel processing. For example, the brightness values of the windows $W_{A1}$~$W_{A6}$ and $W_{91}$~$W_{97}$ may be compared with the reference brightness value L1 simultaneously, and then the brightness values of the windows $W_{81}$~$W_{87}$ may be simultaneously compared with the brightness value of the window $W_{93}$ that has become the new reference brightness value. This way, the windows in a row can be processed simultaneously. Furthermore, in order to achieve high-speed processing, the windows in the left half of the image may be processed using the reference brightness value L1, and the windows in the right half of the image may be processed using a reference brightness value L2. The processes for the right half and the second half may be carried out simultaneously.

In accordance with another aspect of the embodiment, windows surrounded by the windows that have been judged to belong to the road can be automatically judged to belong to the road. This way, the windows that include a marking are determined to belong to the road if they are surrounded by the windows that have been judged to belong to the road. The size of the areas that can be judged to be road areas because they are surrounded by the road areas is determined according to the size of physical objects that are to be detected.

Thus, because the road surface is detected on the basis of brightness values, the road area can be determined even if the vehicle is inclined due to pitching or rolling, and even if it is driving on a slope or a bank. It can be determined that no vehicles or obstructions are present on the road area that has thus been determined.

Markings on the road surface can be accurately determined using the measured distances of the windows. The road area judgment part 34 gets from the distance memory part 8 the measured distances of the windows that have been determined not to belong to the road area based on brightness comparison and determines whether or not such distances are the distances to the road. If the distances are the distances to the road, then the windows in question are judged to include markings on the road surface.

The distances of the windows to the road can be inferred from the measured distances of other windows that have been judged to belong to the road area. For example, it can be inferred that the distance to the road is the same for all windows included in the same row to which the other windows belong. Furthermore, the distance to the road can be inferred for each row of windows from the measured distances of the windows that have been judged to belong to the road area. Accordingly, the road area judgment part 34 can judge whether or not a window belongs to a marking on the road surface by comparing the calculated distance with an inferred distance to the road.

For example, a window $W_{95}$ includes a portion of a character on the road surface as shown in FIG. 3(b). The road area judgment part 34 receives the comparison result for the window $W_{95}$, which is not within the predetermined range. The road area judgment part 34 fetches the measured distance for the window $W_{95}$ from the distance memory part 8. It also fetches the measured distance for another window $W_{93}$ that belongs to the same row as the window $W_{95}$ and has been determined to belong to the road area. If a comparison of the two distances indicates that the distances are substantially the same, the window $W_{95}$ is judged to include a marking on the road surface. By repeating this judgment process, it is possible to recognize the marking "60" on the road surface as shown in FIG. 3(b).

Thus, markings on the road surface can be recognized using the measured distances. The marking information may be used for automatic driving control such as speed control and lane change.

The judgment of the road area described above may be performed for all of the areas of the images input from the imaging sensor, or may be performed for some of the areas. For example, the judgment process may be performed only for image areas newly input as images (relative to previously input images) as the vehicle travels. Furthermore, the road area may also be determined using a preset road model of a car navigation system. The judgment of the road area may be performed at a higher speed by limiting the number of windows for which a judgment is made.

As the road area is determined, the windows in an image can be classified into those belonging to the road area and those not belonging to the road area. If necessary, the road area judgment part 34 may output a road area (constructed from windows judged to be road areas) in the form of an image. FIG. 3(c) shows an example of this image. The detected road area is indicated by shading.

The physical object detection part 35 detects physical objects on the road surface based on the road area judged by the road area judgment part 34. Since the road area is determined, physical objects can be detected by extracting windows that are located ahead of the road area and are determined not to belong to the road area.

For example, as the road area is determined as shown in FIG. 3(c), the windows $W_{57}$, $W_{58}$ and $W_{59}$ that are ahead of the road area and have not been determined to belong to the road area may be extracted. As is shown in FIG. 3(b), these windows include another vehicle that is traveling ahead of the vehicle mounting the system of the present invention. The physical object detection part 35 acquires the distances of these windows from the distance measurement part 8. The distance from the vehicle mounting the system of the invention to the other vehicle can be determined from the acquired distances. Furthermore, from the positions of the windows $W_{57}$, $W_{58}$ and $W_{59}$ relative to the positions of the windows $W_{66}$ through $W_{64}$, it can be determined that the other vehicle is in the center of the road area.

Because the physical object detection part 35 can detect the distance from the present vehicle to other vehicles ahead, the driver can be warned about the distance. Furthermore, in case an obstruction that interferes with vehicle operation is located on the road ahead, an alarm may be activated to alert the driver.

Figure 4:
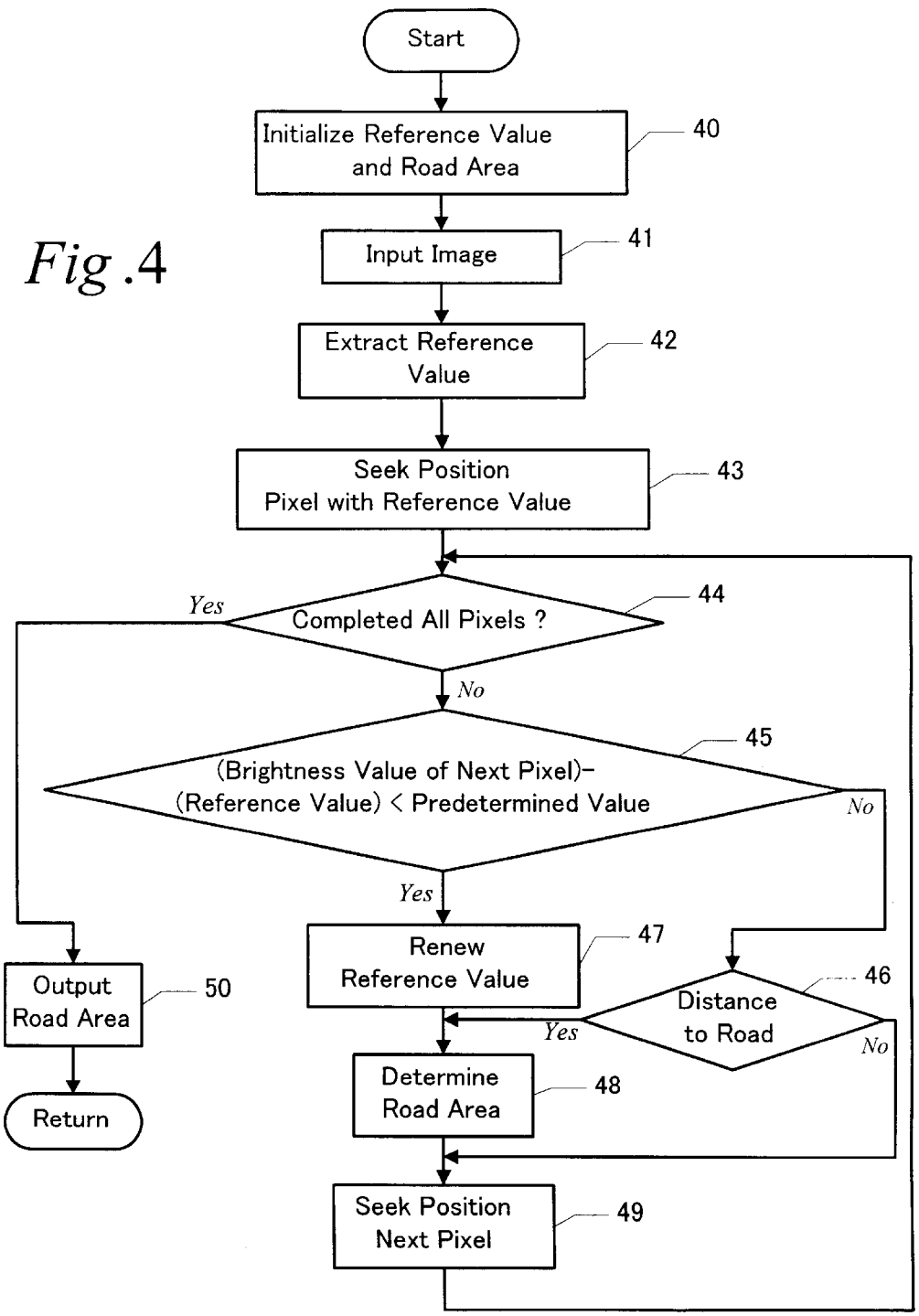
FIG. 4 is a flow chart illustrating the process used to judge road areas.

FIG. 4 is a flow chart of the routine used to judge road areas. This routine can be executed using a software program. This routine is repeatedly executed for input images at predetermined intervals. For the sake of simplicity, each window is assumed to be comprised of a single pixel. Using a pixel with the reference brightness value as a starting point, the brightness values of adjacent pixels are compared with this reference brightness value. When a pixel is judged to belong to the road area, the brightness value of this pixel is taken as a new reference brightness value.

First, a reference brightness value and the road area are initialized (step 40) and the image stored in the image memory 5' is read (step 41). The process then proceeds to step 42 and a reference brightness value is extracted from the input image on the basis of the brightness values of a plurality of pixels corresponding to the area immediately in front of the vehicle. This reference brightness value is stored in the brightness memory part 32.

In step 43, the pixel with the reference brightness value is designated as the initial search position. The search position indicates a pixel for which a road area judgment has been performed. In step 44, judgment is made as to whether or not a road area judgment has been performed for all of the pixels. If pixels for which a judgment has not been made exist, the process proceeds to step 45 in order to process such pixels.

In step 45, the brightness value of a pixel adjacent to the search position is compared with the reference brightness value. If the difference is within a predetermined range, the process proceeds to step 47. Otherwise, the process proceeds to step 46 and judgment is made as to whether or not the measured distance of the pixel adjacent to the search position is the distance to the road. For example, if the pixel of the search position is judged to belong to the road area, a comparison is made with the measured distance of this pixel. If the distances are substantially the same, the measured distance of the pixel adjacent to the search position can be judged to be the distance to the road. If so, the process proceeds to step 48. If the measured distance of the pixel adjacent to the search position is not judged to be the distance to the road, the process proceeds to step 49 and the pixel adjacent to the search position is designated as the next search position. In step 47, the brightness value of the pixel judged to belong to the road area in step 45 is designated as a new reference brightness value. This is because the pixel judged to belong to the road area in step 45 does not include characters/white lines on the road surface. In step 48, the pixel next to the search position is judged to belong to the road area. The process then proceeds to step 49, and the pixel next to the search position is designated as the next search position. In step 44, if judgment has been completed for all the pixels, the process proceeds to step 50 and the road area detected in the image is output.

Thus, it has been shown that, according to the present invention, the road surface itself is determined based on brightness rather than mere distance to the road surface. Accordingly, the road area can be determined with higher precision even when the vehicle is inclined due to pitching or rolling or when the road is a slope or a bank. The reference brightness values are progressively generated as the determination of the windows proceeds so that the road area can be determined with improved precision. Other vehicles and obstructions on the road can be detected based on the detected road area. Markings on the road can be accurately extracted and recognized.

What is claimed is:

1. A road sensor system adapted to be carried on a vehicle, the system comprising:
   an image sensor for capturing an image; and
   a processor that performs the function of dividing said image captured by the image sensor into a plurality of windows and determining at least one brightness value of the window immediately in front of the vehicle, said brightness value being determined on the basis of the windows;
   wherein said processor compares the brightness value of another window with said at least one brightness value and determines that said another window belongs to a road area if the difference is within a predetermined range;
   wherein said at least one brightness value is a reference brightness value, said reference brightness value being progressively generated.

2. A road sensor system of claim 1, wherein the brightness value of the window that has newly been determined to belong to the road area replaces the reference brightness value.

3. A road sensor system of claim 1, further comprising:
   at least two image sensors placed at a predetermined spacing, wherein said processor measures the distance to an object based on the images captured by the image sensors.

4. A road sensor system of claim 3 wherein said processor determines that a window being studied belongs to the road area if the distance measured for said window is within a predetermined range of the other windows that have been determined to belong to the road area even when the brightness comparison indicates that the window being studied does not belong to the road area.

5. A road sensor system of claim 3 wherein said processor determines that the window being studied belongs to a marking on the road if the distance measured for said window is within a predetermined range of the other windows that have been determined to belong to the road area even when the brightness comparison indicates that the window being studied does not belong to the road area.

6. A road sensor system of claim 1 wherein each window comprises one or more pixels.

7. A road detecting system adapted to be carried on a vehicle comprising:
   at least one image sensor for capturing an image;
   means for cutting out a plurality of windows from the image captured by said image sensor;
   means for determining brightness value of each of said windows;
   means for comparing said brightness value with a reference brightness value to determine that each of said window belongs to a road area if the reference is within a predetermined range, wherein said reference brightness value is progressively generated.

8. A road detecting system of claim 7, wherein the brightness value of the window that has newly been determined to belong to the road area replaces the reference value.

9. A road detecting system of claim 7, further comprising:
   means for measuring distance from the image sensor to an object for each of the windows; and
   means for determining that a window being studied belongs to the road area if the distance measured for the window is within a predetermined range of the other windows that have been determined to belong to the road area even when the brightness comparison indicates that the window being studied does not belong to the road area.

10. A method of determining road area comprising the steps of:
    capturing an image of the view in front of a vehicle and dividing the image into a plurality of windows;
    acquiring brightness values respectively for a plurality of windows;
    extracting a reference brightness value on the basis of the plurality of brightness values; and
    comparing the brightness value of other windows with the reference brightness value for determining each of the other windows to be in a road area if the difference is within a predetermined range, wherein said reference brightness value is progressively generated.

11. A method of claim 10, further comprising the step of setting the brightness value of the other window newly determined to be a road area as a new reference brightness value.

12. A method of claims 10, further comprising the step of:
   providing at least two imaging sensors at a predetermined spacing; and
   measuring the distance to an object on the basis of two or more images obtained by the two or more imaging sensors.

13. A method of claim 12, further comprising the step of determining that a window being studied belongs to a marking on the road if the distance measured for the window being studied is within a predetermined range of the distance of one or more windows that have been determined to belong to the road area.

14. The method of claim 10, wherein extracting a reference brightness value on the basis of a plurality of brightness values includes:
   averaging the brightness values for at least two of the plurality of windows to produce an average brightness value; and
   excluding each of the plurality of windows that varies by a predetermined brightness value from the average brightness value.

\* \* \* \* \*